United States Patent Office 3,681,280
Patented Aug. 1, 1972

3,681,280
PROCESS FOR THE PREPARATION OF PIGMENTED POLYOLEFIN FIBERS
Benito Beghelli, Francesco Vacanti, and Giampaolo Guerani, Terni, Italy, assignors to Montecatini Edison S.p.A., Milan, Italy
No Drawing. Filed Sept. 8, 1970, Ser. No. 78,346
Claims priority, application Italy, Sept. 11, 1969, 21,911/69
Int. Cl. C08f 45/04, 45/14
U.S. Cl. 260—41
8 Claims

ABSTRACT OF THE DISCLOSURE

Method of preparing pigmented polyolefins. Involves admixing molten polyolefin with a liquid dispersion of pigment to finely disperse pigment in the polyolefin, thereafter removing the liquid from the molten mass, and then extruding.

BACKGROUND OF THE INVENTION

(1) Field of the invention

The present invention relates to a process for the preparation of pigmented polyolefin fibers. More particularly, this invention relates to a process for the production of pigmented polyolefin fibers that exhibit a very fine and uniform distribution of the pigment.

(2) Description of the prior art

In the preparation of pigmented polyolefin fibers, the technique generally employed is that of incorporating into the polymer, before extrusion thereof, one or more dyeing pigments, organic or inorganic in nature, exhibiting thermal stability under operational spinning conditions and not tending to degrade the polymer.

With such a process, however, generally it is difficult if not impossbile to obtain a good dispersion of the pigment in the polyolefin. Moreover, since the particles of the pigment are rather coarse, considerable difficulties are encountered in the subsequent spinning operation, such as, for example, clogging of the filters and of the holes of the spinneret, evolution of gases, breakage of the filaments emerging from the spinneret, etc.

Various processes have been suggested for improving the fineness of the dispersion of pigments in polyolefins, but heretofore none of them has given any satisfactory results. Thus, for instance, it has been suggested to mix together the polyolefins in the powdery state with liquid dispersions of pigments, with the liquid subsequently being removed by drying. The drying, however, causes a partial reagglomeration of the pigment particles, with a consequent reduction of the fineness of the pigment dispersion in the polymeric mass and thus in the fiber obtained therefrom.

SUMMARY OF THE INVENTION

We have surprisingly found that it is possible to obtain a very fine and uniform dispersion of the pigment in the polyolefin, while at the same time avoiding a subsequent reagglomeration of the pigment particles, by mixing together the polyolefin, while in the molten state, with a liquid dispersion of the pigment and removing the liquid incorporated in the molten mass only at a time after the dispersion of pigment in the molten polyolefin has reached a degree of extreme fineness. Surprisingly, by proceeding in the foregoing manner, removal of the liquid does not cause a reagglomeration of the pigment, inasmuch as the pigment has at this point been finely dispersed in the molten polyolefin.

By "finely dispersed" it is generally meant that the pigment particles have a size below one micron.

DESCRIPTION OF THE PREFERRED EMBODIMENTS

In the practical application of this invention, it is preferred that, during the mixing of the molten polyolefin with the pigment, the pigment itself always be wetted by the liquid in which it is dispersed. Under such conditions the pigment is in fact very friable, does not reagglomerate, is not subject to electrostatic charges, and disperses with extreme ease and speed in the molten polyolefin mass.

As previously stated, the adding of the pigment dispersion to the polyolefin must be carried out when the polyolefin is in the molten state. Therefore, it is preferable to carry out this admixing during either the granulating or the spinning operation.

If the admixing is effected during spinning, there may be advantageously employed worm-screw extruders provided with an injecting device and a degassing gate valve. With such types of extruders, the liquid dispersion of the pigment is injected into the molten polyolefin contained in the extruder through the injection device and the liquid is subsequently removed through the degassing valve.

In the process of this invention, there are desirably employed crystalline polyolefins consisting essentially of isotactic macromolecules, obtained by low-pressure polymerization using stereospecific catalysts.

The crystalline polyolefin is preferably crystalline polypropylene essentially consisting of isotactic macromolecules and obtained by stereospecific polymerization of propylene, or a crystalline propylene/ethylene copolymer having a prevailing content (greater than 50 percent by weight) of units derived from the propylene monomer. Generally, polymers suitable for the process of this invention are crystalline polyolefins obtained from monomers of the formula: $R-CH=CH_2$, wherein R is hydrogen, alkyl, or aryl, such as, for instance, polyethylene, polypropylene, polybutene-1, polypentene-1, polyhexene-1, poly-4-methylpentene-1, polyoctene-1, polystyrene, and the like.

Pigments, which are, of course, to be used in the form of a liquid dispersion, may be organic or inorganic in nature, and may be used singly or in admixture with one another. The pigment should exhibit a high thermal stability and not exert a degrading action on the polymer. Suitable pigments include azo pigments, phthalocyanines, vat dyes, lakes, titanium dioxide, the ferric oxide pigments, carbon black, etc.

The pigment dispersion may be obtained by known methods using mixers of conventional type, such as, for instance, a Kottoff siren mixer. Generally, for the preparation of the dispersion the pigment is used in the powdery state, such state being obtained either during the production of the pigment or by subsequent grinding. It is also possible to use directly the wet filter cake obtained upon synthesis of the pigment, i.e., before drying.

As the liquid medium for the dispersion there may be used either water or an organic solvent. If an organic solvent is utilized, those that are relatively volatile and are miscible with water are preferred. Preferred organic solvents include alcohols and ketones of relatively low molecular weight, e.g., methyl alcohol, ethyl alcohol, isopropyl alcohol, acetone, etc.

The concentration of pigment in the liquid dispersions is not critical and may vary over a wide range. In general, however, the concentration is from about 10% to 60% by weight.

With the polyolefin there may be admixed, either before or after the addition of the pigment, conventional additives such as stabilizers, opacifiers, antistatic agents, and other auxiliary additives.

The following examples will further illustrate the invention. All parts are by weight unless otherwise stated.

EXAMPLE 1

A pigment dispersion was prepared by mixing a Kottoff siren type mixer in, at room temperature, the following materials:

|  | Kg. |
|---|---|
| Methanol | 77.8 |
| Cromoftal BR red pigment (C.I. pigment red 144) | 22.2 |

The dispersion was then finely ground in an Admiral mill of the Koruma type. The pigment dispersion thus obtained (in which the pigment particles had a size below 1 micron) was then injected by means of a gear pump into a granulator fed with polypropylene (having a Melt Index=18; ash content=0.001%; residue after extraction with heptane=97%) under the following conditions:

| Atmosphere of inert gas | Nitrogen |
|---|---|
| Worm-screw temperature °C | 210 |
| Feed rate of the polypropylene kg./hr | 70 |
| Feed rate of pigment dispersion kg./hr | 9.450 |
| Diameter of the two extruder worm-screws mm | 83 |
| Screw speed r.p.m | 80 |
| Absolute pressure on the degassing gate mm. Hg | 100 |

The granulate thus obtained was very homogeneous in nature, and the pigment dispersion in the polypropylene mass was extremely fine and free of agglomeration, as was demonstrated by inspection of a photographic blow-up of a cross section of the granulate.

The granulate was then spun under the following conditions:

Spinneret with 254 holes (hole diameter: 0.8 mm., hole length 16 mm.)
Worm-screw temperature: 280° C.
Spinneret temperature: 265° C.
Maximum pressure: 40 kg./cm.²
Winding speed: 800 meters/min.

The filament, after stretching in steam at 130° C. with a stretching ratio of 4.8:1, was intensely and uniformly dyed red.

EXAMPLE 2

A pigment dispersion was prepared by mixing together in a Kottoff siren type mixer and at room temperature:

|  | Kg. |
|---|---|
| Methanol | 71.5 |
| Cromoftal GF green (C.I. pigment green 7) | 125.530 |
| Graftole RCL yellow (C.I. pigment yellow 85) | 1.190 |
| Ferric oxide (C.I. pigment red 101) | 1.780 |

The dispersion was then finely ground in an Admiral type colloid grinder (particle size below 1 micron).

The pigment dispersion thus obtained was injected by means of a gear pump into a granulator fed with polypropylene (having a Melt Index=18; ash content=0.001%; residue from heptane extraction=97%), under the following conditions:

| Inert gas atmosphere | Nitrogen |
|---|---|
| Worm-screw temperature °C | 210 |
| Feed rate of polypropylene kg./hr | 70 |
| Feed rate of pigment dispersion kg./hr | 11.760 |
| Diameter of worm-screws of the extruder mm | 85 |
| Speed of extruder's worm-screws r.p.m | 80 |
| Absolute pressure on the degassing gate mm. Hg | 110 |

The granulate obtained was a very homogeneous mixture, with the dispersion of pigment in the mass of polypropylene being extremely fine and free of agglomerates.

The granulate was spun under the following conditions:

Spinneret having 254 holes (diameter of each hole=0.8 mm., length of each hole=16 mm.)
Temperature of worm-screw: 280° C.
Temperature of spinneret: 280° C.
Maximum pressure: 40 kg./sq. cm.
Winding speed: 800 meters/min.

The filament, after stretching in steam at 130° C. with a stretch ratio of 1:4.8, was intensely and uniformly dyed green.

EXAMPLE 3

There was prepared a pigment dispersion by mixing in a siren type Kottoff mixer at room temperature:

|  | Kg. |
|---|---|
| Water | 37.5 |
| Ethyl alcohol | 37.5 |
| Rubyno Vulcafix B (C.I. pigment red 57) | 7.250 |
| Black Delussa FWI (C.I. pigment black 7) | 0.400 |
| Nylofilblue BLL (C.I. pigment blue 15) | 17.350 |

This dispersion was then finely ground in a Koruma type colloid mill. The pigment dispersion thus obtained was injected through a gear pump into a granulator fed with polypropylene (having a Melt Index=18; ash content=0.001%; residue after heptane extraction 97%), under the following conditions:

| Inert gas atmosphere | Nitrogen |
|---|---|
| Worm-screw temperature °C | 210 |
| Feed rate of polypropylene kg./hr | 70 |
| Feed rate of pigment dispersion kg./hr | 10 |
| Diameter of extrusion worm-screws mm | 83 |
| Speed of worm-screws r.p.m | 80 |
| Absolute pressure on the degassing gate mm. Hg | 110 |

The granulate that was obtained was a very homogeneous mixture, and the dispersion of pigment in the polypropylene mass was extremely fine and free of agglomerates. The granulate was spun under the following operational conditions:

Spinneret having 254 holes (diameter of each hole=0.8 mm., length of each hole=16 mm.)
Temperature of worm-screw: 280° C.
Temperature of spinneret: 265° C.
Maximum pressure: 40 kg./cm.²
Winding speed: 800 meters/min.

After stretching in steam at 130° C. with a stretch ratio of 4.8:1, the resulting filament was intensely and uniformly dyed blue.

EXAMPLE 4

In a vessel fitted with a vaned stirrer, there was prepared the following dispersion:

|  | Kg. |
|---|---|
| Methyl alcohol | 75 |
| Nylofilblue BLL (C.I. pigment blue 15) | 25 |

The dispersion was then finely ground in a Koruma type colloid mill. The pigment dispersion thus obtained was injected by means of a gear pump into a two-screw extruder fed with polypropylene in powder form. The extruder was directly connected to a spinneret and the pigmented polyolefin was extruded in the form of a fiber.

The spinning was carried out under the following conditions:

| Feed rate of polypropylene (having a Melt Index=18; ash content=0.001%; residue after extraction with heptane=97%) kg./hr | 60 |
|---|---|
| Feed rate pigment dispersion kg./hr | 5 |
| Extruder temperature °C | 230 |
| Diameter of extruder screws mm | 83 |
| Speed of extruder screws r.p.m | 70 |
| Absolute pressure on degassing gate m. Hg | 110 |
| Spinneret temperature °C | 230 |
| Number of spinneret holes | 7360 |
| Diameter of spinneret holes mm | 0.7 |
| Length of spinneret holes mm | 3 |

The filament, after stretching in steam at 100° C. with a stretch ratio equal to 3.4:1, was intensely and uniformly dyed blue.

EXAMPLE 5

A pigment dispersion was prepared by mixing together in a siren type mixer:

| | Kg. |
|---|---|
| Ethyl alcohol | 75 |
| Cromoftal GF green (C. I. pigment green 7) | 25 |

The dispersion was then finely ground in a colloid mill of the Admiral type. The pigment dispersion was then injected by means of a gear pump into a single-screw extruder fed with polyethylene. The conditions were as follows:

| | | |
|---|---|---|
| Extruder diameter | mm | 45 |
| Extruding screw temperature | ° C. | 240 |
| Melt Index of the polyethylene | | 1.2 |

Film working under the following conditions:

| | | |
|---|---|---|
| Temperature of extruding screw | ° C. | 300 |
| Temperature of extruding head | ° C. | 290 |
| Flow-rate | kg./hr. | 50 |
| Speed of extruding screw | r.p.m. | 100 |
| Winding-speed for the film | meters/mm. | 70 |

The film obtained showed an intense and uniform green color and was very transparent, this transparency being a function of fine dispersion of pigment in the polyolefin mass.

Variations can, of course, be made without departing from the spirit and scope of the invention.

Having thus described the invention, what is desired to be secured by Letters Patent and hereby claimed is:

1. In the method of preparing pigmented fibers, films and like articles from polyolefins, this method comprising admixing a pigment with a polyolefin and extruding said mixture, the improvement comprising first melting said polyolefin and then admixing said polyolefin, while in the molten state, with a dispersion of said pigment in a volatile liquid to thereby extremely finely disperse said pigment in said polyolefin, and, after effecting said fine dispersion, removing the liquid from the molten mass.

2. The method of claim 1, wherein the admixing of molten polyolefin with the liquid dispersion of pigment is effected during granulation.

3. The method of claim 1, wherein the admixing of molten polyolefin with the liquid dispersion of pigment is effected during extrusion.

4. The method of claim 1, wherein an aqueous pigment dispersion is employed.

5. The method of claim 1, wherein a pigment dispersed in an organic solvent is employed.

6. The method of claim 1, wherein the polyolefin is a crystalline polyolefin consisting essentially of isotactic macromolecules.

7. The method of claim 6, wherein the polyolefin is crystalline polypropylene consisting essentially of isotactic macromolecules.

8. The method of claim 6, wherein the polyolefin is a crystalline propylene/ethylene copolymer having a preponderating propylene content.

References Cited

UNITED STATES PATENTS

| 3,085,988 | 4/1963 | Hull et al. | 260—33.6 |

FOREIGN PATENTS

| 233,211 | 4/1961 | Australia | 260—41 |
| 281,455 | 12/1963 | Australia | 260—41 |

MORRIS LIEBMAN, Primary Examiner

J. H. DERRINGTON, Assistant Examiner

U.S. Cl. X.R.

260—34.2; 264—211